E. P. SPAHN.
Photographic Cameras.
No. 139,090. Patented May 20, 1873.
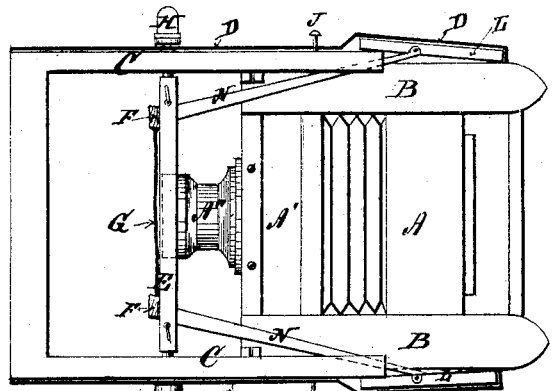
Fig: 1
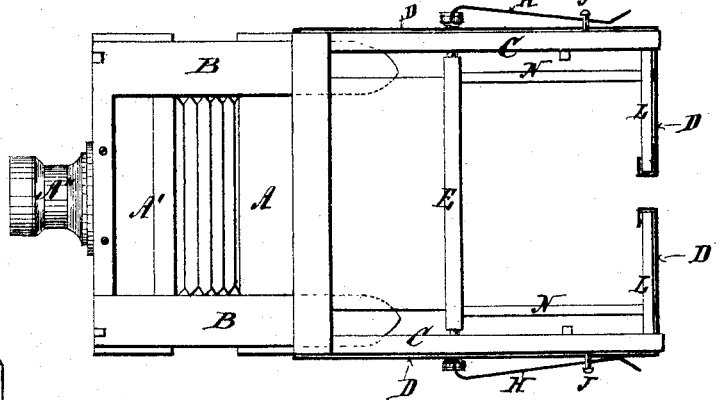
Fig: 2
Fig: 3
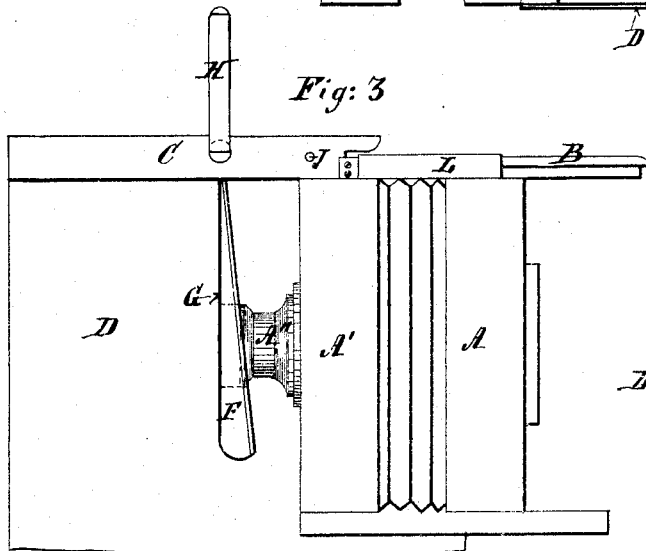
Fig: 4
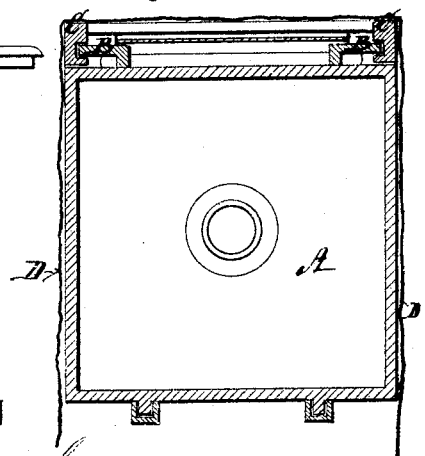
Witnesses:
J. C. Tunbridge
Henry E. Roeder
Inventor
Emile P. Spahn

UNITED STATES PATENT OFFICE.

EMILE P. SPAHN, OF NEWARK, NEW JERSEY.

IMPROVEMENT IN PHOTOGRAPHIC CAMERAS.

Specification forming part of Letters Patent No. 139,090, dated May 20, 1873; application filed March 31, 1873.

*To all whom it may concern:*

Be it known that I, EMILE P. SPAHN, of Newark, in the State of New Jersey, have invented certain new Improvements in Attachment for Photographic Camera, of which the following is a specification:

The object of this invention is to supersede the use of the loose dark-cloth with which the operator covers his head and the ground glass in focusing; further, the hood which is put around the tube to protect it from side light, and the shutter or other arrangement necessary to open and close the instrument for the purpose of exposing. To accomplish this, two slides are placed on the top of the camera, the ends of which are fastened to the front and stationary part of the camera, while the other ends rest loosely on the back or movable part. These slides guide two movable grooved slides, to which the arrangements necessary to obtain the objects of my invention are attached.

In the accompanying drawing, Figures 1 and 2 represent top views of my improved attachment, in different positions, embodying my invention. Fig. 3 is a side elevation with one of the curtains removed. Fig. 4 is an end view of the same.

Similar letters represent similar parts.

A A' represents parts of a camera, where A designates the stationary part, and A' the movable part. B are the slides, which are attached to the stationary part A of the camera, and C are the movable slides or frame. This frame C is covered on the top with cloth or other material, not represented in the drawing, and has on its sides curtains D D attached, which fall down close on the right and left of the camera. When the slide or frame C is moved beyond the front end of the stationary slides, as shown in Fig. 1, the curtain shades the front of the camera, and so substitutes the hood around the tube A'', and when said slide or frame C is pulled beyond the back ends of the stationary slides, the curtain shades the ground glass behind the camera, and so substitutes the focusing cloth hitherto used, Fig. 2. E is a cross-bar arranged between the slides C, capable of turning on its axis, to which rods F F are attached, between which and this cross-bar E, a cloth, G, is stretched. Whenever the slide or frame C is moved forward, this curtain falls down over the front of the tube A'', perfectly covering the same. When the frame or slides, C, are pulled back, the ends of the stationary slides B B come against the rods F F, and force the same together with its curtain or cloth G up again. Upon the ends of the axis of the cross-bar E levers H are fastened for the purpose of operating said cross-bar E, rods F, and curtain G for exposing. A small screw or stop, J, is arranged in the sides of the slides C for the purpose of holding the levers H fast when the curtain G has been moved away from the tube A'', when the levers H are loosened from these stops J. This cross-bar E with its curtain is operated in the manner above described. The bar E with its drop-curtain, may be attached to the stationary slides B B, instead of to the movable slides C C, in which case suitable elevations must be made on the movable slides or frame, which in being pulled backward would catch the levers and raise the drop-curtain, and in being pushed to the front, drop it again. On the after ends of the slides C C, extension rods or bars L L are hinged, to which a continuation of the curtains D D is attached. These bars turn inward, and are of such a length that their ends nearly meet when closed, (see Fig. 2,) so as to complete the darkness behind the ground glass. These bars L L are connected by an India-rubber band, N N, or other suitable spring, with the cross-bar E, by which arrangement these bars are moved inward so as to close as soon as the same have passed the ends of the stationary slides B. In pushing the slide C forward, the ends of these stationary slides B force the hinges open. The same effect may be obtained by leaving off the hinged piece with its curtain on one side, and in enlarging in that case that on the other side to extend the whole width of the camera or frame.

When the operator wants to focus, he will pull the frame backward, which will serve three purposes at the same time, namely: it will open the instrument in front; it will put his head and the ground glass in complete darkness, and it will remove the hood around the tube, (see Fig. 2.) If he pushes the frame forward it will perform three other functions, namely: the curtain will close the instrument in front; it will remove the curtain from around the ground glass, and it will form a hood around the instrument excluding all side lights.

What I claim as my invention, and desire to secure by Letters Patent, is—

1. The arrangement of the sliding frame C in combination with curtains D, substantially in the manner and for the purpose hereinbefore described.

2. The arrangement of the hinged bars L L, on the end of the sliding frame C, in combination with suitable India-rubber bands or springs N N, and the curtains D, substantially as and for the purpose described.

3. The arrangement of the movable bar E, with rods F, and curtain G, in combination with the movable frame C, operating in the manner and for the purpose substantially as specified.

EMILE P. SPAHN.

Witnesses:
CHARLES SPROTTE,
J. K. DUNLAP.